(12) United States Patent
Arkles et al.

(10) Patent No.: US 10,392,530 B2
(45) Date of Patent: Aug. 27, 2019

(54) UV CURABLE ADHESIVE AND COATING COMPOSITIONS ACTIVATED BY SURFACE HYDROXYL GROUPS OR MOISTURE

(71) Applicant: Gelest Technologies, Inc., Morrisville, PA (US)

(72) Inventors: Barry C. Arkles, Pipersville, PA (US); Jonathan D. Goff, Philadelphia, PA (US)

(73) Assignee: Gelest Technologies, Inc., Morrisville, PA (US)

( * ) Notice: Subject to any disclaimer, the term of this patent is extended or adjusted under 35 U.S.C. 154(b) by 66 days.

(21) Appl. No.: 15/820,535

(22) Filed: Nov. 22, 2017

(65) Prior Publication Data
US 2018/0142126 A1    May 24, 2018

Related U.S. Application Data

(60) Provisional application No. 62/425,771, filed on Nov. 23, 2016.

(51) Int. Cl.
| | |
|---|---|
| *C08G 77/28* | (2006.01) |
| *C09D 183/04* | (2006.01) |
| *C09D 4/00* | (2006.01) |
| C08G 77/20 | (2006.01) |

(52) U.S. Cl.
CPC ............. *C09D 183/04* (2013.01); *C09D 4/00* (2013.01); *C08G 77/20* (2013.01)

(58) Field of Classification Search
CPC ........ C08G 77/00; C08G 77/20; C08G 77/28; C07F 7/0898; C09D 183/08; C09D 183/04; C09D 4/00; C08K 5/549; C08K 5/548

See application file for complete search history.

(56) References Cited

U.S. PATENT DOCUMENTS 6,310,161 B1    10/2001    Weissman

OTHER PUBLICATIONS

CA Registry Entry, RN 16456-13-6 (Nov. 16, 1994) (Year: 1984).*
International Search Report and Written Opinion dated Feb. 13, 2018 in International Application No. PCT/US2017/062669.
Kim et al., "Facile Surface Modification of Hydroxylated Silicon Nanostructures Using Heterocyclic Silanes," Journal of the American Chemical Society, vol. 138, No. 46, pp. 15106-15109 (Nov. 7, 2016).
Hoyle et al., "Thiol-Enes: Chemistry of the Past with Promise for the Future", Journ. Poly Sci Polymer Chemistry, vol. 42, pp. 5301-5338 (2004).
Muller et al., "Photocrosslinking of Silicones. Part 11. Radical Photopolymerization Under Oxygen-Silicone Acrylates as Model Systems", Journ. of Macromol Sci., vol. A31, No. 12, pp. 1905-1926 (1994).
Nguyen et al., "Ultrafast Diffusion-Controlled Thiol-ene Based Crosslinking of Silicone Elastomers with Tailored Mechanical Properties for Biomedical Applications", Polymer Chemistry, vol. 7, pp. 5281-5293 (2016).

* cited by examiner

*Primary Examiner* — Sanza L. McClendon
(74) *Attorney, Agent, or Firm* — Panitch Schwarze Belisario & Nadel LLP

(57) ABSTRACT

Compositions which undergo cure by irradiation with UV, visible light or electron beam only after activation by hydroxylated surfaces or exposure to moisture are based on mixtures of cyclic thiasilanes and unsaturated silanes, siloxanes or hydrocarbons.

24 Claims, No Drawings

UV CURABLE ADHESIVE AND COATING COMPOSITIONS ACTIVATED BY SURFACE HYDROXYL GROUPS OR MOISTURE

CROSS-REFERENCE TO RELATED APPLICATIONS

This application claims priority from U.S. Provisional Patent Application No. 62/425,771, filed Nov. 23, 2016, the disclosure of which is herein incorporated by reference.

BACKGROUND OF THE INVENTION

Radiation-cured "radcure" coatings are formulated materials that are cross-linked or cured using energy from electron beams or from ultraviolet or visible light radiation. Radcure coatings facilitate high-throughput production with low thermal energy requirements. Typically, cure is initiated throughout the bulk of the coating, but more particularly nearest to the source of the irradiation (unless there are atmospheric oxygen inhibition effects). The performance of most radcure materials, whether protective or adhesive, relies on strong bonding to the surface.

The most widely used radcure materials contain photoinitiators and other low molecular weight species. During the radiation cure, these materials tend to be excluded from the bulk polymerization phase, diffusing either to the exposed surface or the interface between the substrate and the polymerized bulk. When low molecular weight species diffuse to the interface, there is a general tendency to reduce or compromise adhesion. Another undesirable consequence is the diffusion of the low molecular weight species to the exposed or exterior surface, where they accumulate and plasticize the bulk resin, and tackiness is often observed.

There is an obvious need to maximize interfacial bonding in both adhesives and protective coatings and, in particular, it is of great value to do this in radcure compositions. Initiating cure at the polymer-substrate interface rather than in the bulk or surface closest to radiation source has intrinsic advantages because primary reactions would initiate at the interface and non-reactive and low molecular weight species would be forced to diffuse from the highly crosslinked area. Similarly, a cure initiated at the exposed surface would reduce the tendency to form "tacky" films. Further, there are instances in which it would be desirable to control photoinitiation, particularly in environments in which exposure to even low levels of light prior to formal cure has deleterious effects.

Premature radiation cure (prior to application to a substrate) is a problem not only under storage conditions, but in developing optimum performance in adhesive bonding applications. A composition that undergoes a radiation cure that can be switched on by exposure to surface hydroxyl groups or atmospheric moisture is a "dual exposure system" which precludes premature cure by random exposure to radiation. In the case of surface hydroxyl activation, maximum bonding to the surface is ensured by activating polymerization (cure) at the surface.

DETAILED DESCRIPTION OF THE INVENTION

The invention is directed to a "cryptic" or "masked" mercaptan, more specifically a cyclic thiasilacyclopentane which, in combination with a polymer or molecule having multiple sites of unsaturated functionality, can be induced to undergo surface-initiated radcure when applied to surfaces possessing hydroxyl groups such as inorganic siliceous substrates. These compositions are beneficial in reducing tack because hydroxyl groups in the form of moisture diffuse into the exposed surface and induce radcure. The compositions according to the invention can generally be considered to be latent thiol-ene mixtures that form resins on step-wise exposure to hydroxyl groups followed by irradiation. The chemistry of the thiol-ene reaction in the context of polymer chemistry has been the subject of review by Hoyle et al (*J. Poly Sci., A: Polymer Chemistry*, 42, 5301-5338 (2004)). Further, thiol-ene siloxanes are discussed in U.S. Pat. No. 6,310,161, and in U. Muller et al. (*J Macromol Sci Pure Appl Chem* 33, 439 (1996)), and K. D. Q Nguyen et al, (*Polymer Chemistry*, 7 (33); (2016)) describes siloxanes with thiol and unsaturated groups.

The hydroxyl initiated formation of a mercaptan from a cyclic thiasilane, as shown below, is extremely rapid: less than a minute or more typically on the order of seconds. This speed is due primarily to the thermodynamic advantage of forming a silicon-oxygen bond in preference to a silicon-sulfur bond and, secondarily, the relief of ring-strain of the cyclic thiasilane. This time-scale is important since the speed of reaction should be close to the speed of radcure process lines. Once formed, the mercaptan or "thiol" group adds to an olefinic or "ene" group in the presence of an irradiation source.

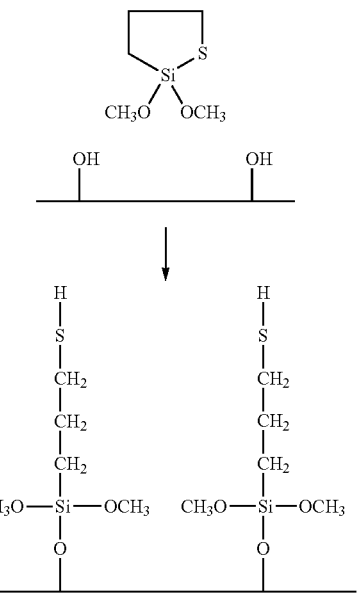

The compositions according to the invention thus comprise a cyclic thiasilacyclopentane (also referred to herein as a cyclic thiasilane) and an unsaturated (olefinic) component. The cyclic thiasilanes of the invention are five membered rings containing an Si—S linkage and three carbons. Additional substitution on the ring may include alkyl groups, preferably methyl groups, alkoxy groups on the Si, such as the preferred methoxy or ethoxy groups, or combinations of both alkyl or alkoxy groups. The use of unsubstituted thiasilanes is also within the scope of the invention. Preferred cyclic thiasilanes include 2,2-dimethoxy-1-thia-2-silacyclopentane, as well as the diethoxy and methylmethoxy analogs.

The unsaturated component may be a polymer or a molecule, including a silane, siloxane, or hydrocarbon, and preferably has a multiplicity of unsaturated sites, such as the preferred polybutadiene and other unsaturated resins. The term "multiplicity" may be understood to refer to two or more unsaturated sites. More preferred are siloxanes and other silicon containing species, such as tetravinyltetramethylcyclotetrasiloxane, vinylmethoxysiloxane oligomers, and vinylmethylsiloxane copolymers. Unsaturated materials with only a single position of unsaturation may be utilized in the inventive compositions if there are multiple alkoxy substitutions on the silicon containing species. Exemplary unsaturated components include vinylmethoxysiloxane homopolymers, vinyltrimethoxysilane, 1,3,5,7-tetravinyl-1,3,5,7-tetramethylcyclotetrasiloxane, vinyl terminated (diphenylsiloxane)-dimethylsiloxane copolymers, allyloxy(tetraethylene oxide) methyl ether, and 1-octene.

In a preferred embodiment, the optimum ratio of the components in the composition is one mercaptan (SH) for each unit of unsaturation (CH=CH).

It has been found that combinations of cyclic thiasilanes and unsaturated species do not undergo radical induced reactions in the absence of hydroxyl species. However, once exposed to a hydroxyl source from a surface such as glass, silica or alumina, or from atmospheric moisture, the cyclic thiasilane undergoes a ring-opening reaction in which a mercapto (—SH) group is formed and is then able to undergo a radiation-induced reaction with an unsaturated group. The irradiation may be performed concurrently with or subsequent to the exposure to the hydroxyl source. If not performed concurrently, there is no limitation on the delay between exposure and irradiation unless the mercaptan is oxidized in a slow process by atmospheric oxygen. For practical purposes, preferred reaction times between the cyclic thiasilane and the surface or atmospheric moisture are about 15 seconds to about 30 minutes, more preferably about 5 to about 10 minutes. Radiation may be provided by a UV source, visible light, or electron beam. In a preferred embodiment, radiation is provided by a UV source. While this reaction by itself may induce cure, i.e, the conversion of a liquid to a solid, further cure and crosslinking may occur by hydrolytically-induced condensation if there are alkoxy substitution on silicon atoms in the cyclic compound or in the unsaturated component. The resulting material is a solid film or solid mass.

The invention also relates to a method for producing a solid film or encapsulant by exposing a composition to hydroxyl groups on a surface or atmospheric moisture followed by or concurrently with irradiating the composition. The composition comprises a cyclic thiasilacyclopentane and an unsaturated component as previously described. Radiation may be provided by a UV source, visible light, or electron beam. In a preferred embodiment, radiation is provided by a UV source. In one embodiment, the irradiation is performed in the presence of a substrate such as glass or fumed silica, which have surfaces with hydroxyl groups.

The ability to inhibit moisture-initiated crack propagation of vitreous surfaces is an important advantage of the coatings of the invention. An example is in the manufacture of optical fibers, where these compositions can react with optical fibers immediately after the fibers are drawn from a preform at speeds consistent with the drawing process. Further, by reacting with the surface defects associated with hydroxyl groups and the rapid formation by UV-cure of a protective cladding, water adsorption associated crack propagation is reduced, the fiber is protected from mechanical damage and, consequently, the strength of the fibers is increased.

The invention will now be described in connection with the following, non-limiting examples. Examples are designated "comparative" if they are not inventive and, in the absence of hydroxyl or moisture activation prior to or concomitant with radiation exposure, no cure occurred.

In all Examples, a Uvitron International Porta-ray 400R UV1197 portable UV/visible light curing system was used as the UV source. The UV lamp was a 400 Watt metal halide: radiation flux (72 watt), 315-400 nm, peak irradiance 500 mW/cm$^2$ (UVA).

Example 1 (Comparative): Mixture of 2,2-Dimethoxy-1-Thia-2-Silacyclopentane and Vinylmethoxysiloxane Homopolymer, 8-12 cSt Exposed to Heat in Dry, Inert Atmosphere

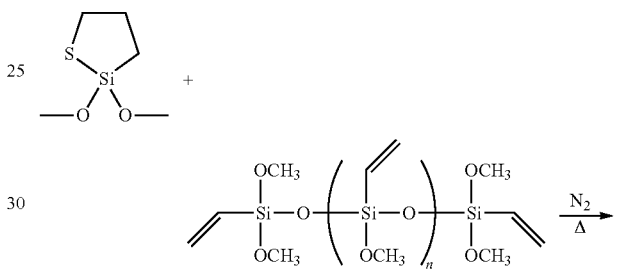

2,2-Dimethoxy-1-thia-2-silacyclopentane (Gelest product code: SID3545.0) and vinylmethoxysiloxane homopolymer, 8-12 cSt (Gelest product code: VMM-010) were added to a vial in a 1:1 ratio by weight. The vial was vigorously mixed for 5 minutes and then approximately 1 g of the mixture was added to a scintillation vial. The vial was purged with N$_2$, sealed with a cap and tape and heated at 110° C. for 1 hour. The material remained a clear liquid. No cure was observed.

Example 2 (Comparative): Mixture of 2,2-Dimethoxy-1-Thia-2-Silacyclopentane and Vinylmethoxysiloxane Homopolymer, 8-12 cSt Exposed to Heat in Air

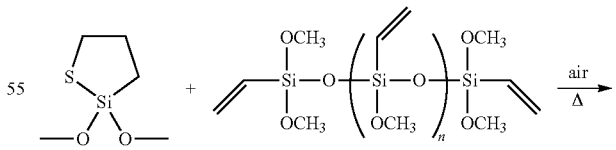

2,2-Dimethoxy-1-thia-2-silacyclopentane (Gelest product code: SID3545.0) and vinylmethoxysiloxane homopolymer, 8-12 cSt (Gelest product code: VMM-010) were added to a vial in a 1:1 ratio by weight. The vial was vigorously mixed for 5 minutes and then approximately 1 g of the mixture was added to a scintillation vial. The vial was sealed with a cap and tape and heated at 110° C. for 1 hour. The material remained a clear liquid. No cure was observed.

Example 3 (Comparative): Mixture of 2,2-Dimethoxy-1-Thia-2-Silacyclopentane and Vinylmethoxysiloxane Homopolymer, 8-12 cSt Exposed to UV Source in Dry, Inert Atmosphere

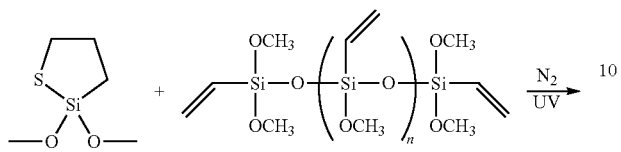

2,2-Dimethoxy-1-thia-2-silacyclopentane (Gelest product code: SID3545.0) and vinylmethoxysiloxane homopolymer, 8-12 cSt (Gelest product code: VMM-010) were added to a vial in a 1:1 ratio by weight. The vial was vigorously mixed for 5 minutes and then approximately 1 g of the mixture was added to a round bottom flask. The flask was purged with $N_2$ and sealed using a glass stopper and clamp. The material was exposed to a UV lamp through the side of the flask for approximately 30 minutes. The material remained a clear liquid; a solid was not formed. No cure was observed.

Example 4: Mixture of 2,2-Dimethoxy-1-Thia-2-Silacyclopentane and Vinylmethoxysiloxane Homopolymer, 8-12 cSt Exposed to UV Source in Air

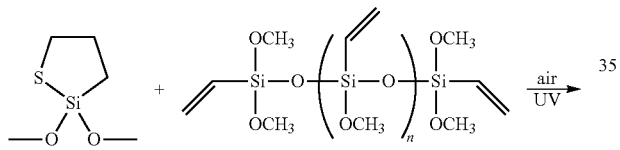

2,2-Dimethoxy-1-thia-2-silacyclopentane (Gelest product code: SID3545.0) and vinylmethoxysiloxane homopolymer, 8-12 cSt (Gelest product code: VMM-010) were added to a vial in a 1:1 ratio by weight. The vial was vigorously mixed for 5 minutes, and then the mixture was added to a small glass petri dish in a thin layer (<0.5 mm) and exposed to a UV lamp for 10 minutes. Radiation cure was observed. The resulting material was a clear solid with some cracking.

Example 5: Mixture of 2,2-Dimethoxy-1-Thia-2-Silacyclopentane and Vinylmethoxysiloxane Homopolymer, 8-12 cSt Exposed to UV Source in Air

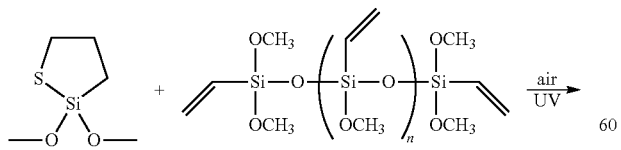

2,2-Dimethoxy-1-thia-2-silacyclopentane (Gelest product code: SID3545.0) and vinylmethoxysiloxane homopolymer, 8-12 cSt (Gelest product code: VMM-010) were added to a vial in a 1:1 ratio by weight. The vial was vigorously mixed for 5 minutes and then approximately 1 g of the mixture was added to a round bottom flask. The material was exposed to a UV lamp through the side of the flask for approximately 30 minutes. Radiation cure was observed and the resulting material was a clear solid.

Example 6 (Comparative): Mixture of 2,2-Dimethoxy-1-Thia-2-Silacyclopentane and Vinyltrimethoxysilane Exposed to Heat in Dry, Inert Atmosphere

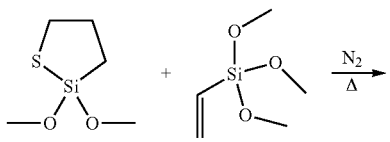

2,2-Dimethoxy-1-thia-2-silacyclopentane (Gelest product code: SID3545.0) and vinyltrimethoxysilane (Gelest product code: SIV9220.0) were added to a vial in a 1:1 ratio by weight. The vial was vigorously mixed for 5 minutes and then approximately 1 g of the mixture was added to a scintillation vial. The vial was purged with $N_2$, sealed with a cap and tape, and heated at 110° C. for 1 hour. The material remained a clear liquid. No cure was observed.

Example 7 (Comparative): Mixture of 2,2-Dimethoxy-1-Thia-2-Silacyclopentane and Vinyltrimethoxysilane Exposed to Heat in Air

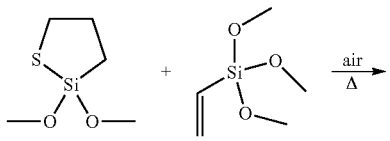

2,2-Dimethoxy-1-thia-2-silacyclopentane (Gelest product code: SID3545.0) and vinyltrimethoxysilane (Gelest product code: SIV9220.0) were added to a vial in a 1:1 ratio by weight. The vial was vigorously mixed for 5 minutes. Approximately 1 g of the mixture was added to a scintillation vial. The vial was sealed with a cap and tape and heated at 110° C. for 1 hour. The material remained a clear liquid. No cure was observed.

Example 8 (Comparative): Mixture of 2,2-Dimethoxy-1-Thia-2-Silacyclopentane and Vinyltrimethoxysilane Exposed to UV Source in Dry, Inert Atmosphere

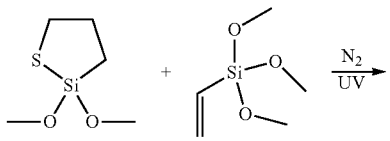

2,2-Dimethoxy-1-thia-2-silacyclopentane (Gelest product code: SID3545.0) and vinyltrimethoxysilane (Gelest product code: SIV9220.0) were added to a vial in a 1:1 ratio by weight. The vial was vigorously mixed for 5 minutes. Approximately 1 g of the mixture was then added to a round bottom flask. The flask was purged with N₂ and sealed using a glass stopper and clamp. The material was exposed to a UV lamp through the side of the flask for approximately 30 minutes. The material remained a clear liquid. No cure was observed.

Example 9: Mixture of 2,2-Dimethoxy-1-Thia-2-Silacyclopentane and Vinyltrimethoxysilane Exposed to UV Source in Air

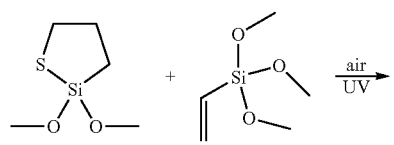

2,2-Dimethoxy-1-thia-2-silacyclopentane (Gelest product code: SID3545.0) and vinyltrimethoxysilane (Gelest product code: SIV9220.0) were added to a vial in a 1:1 ratio by weight. The vial was vigorously mixed for 5 minutes. The mixture was added to a small glass petri dish in a thin layer (<0.5 mm) and exposed to a UV lamp for 10 minutes. Radiation cure was observed. The resulting material was a clear, brittle solid.

Example 10: Mixture of 2,2-Dimethoxy-1-Thia-2-Silacyclopentane and Vinyltrimethoxysilane Exposed to UV Source in Air

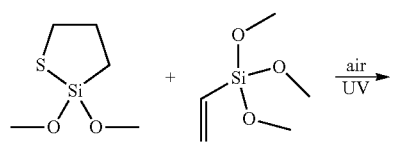

2,2-Dimethoxy-1-thia-2-silacyclopentane (Gelest product code: SID3545.0) and vinyltrimethoxysilane (Gelest product code: SIV9220.0) were added to a vial in a 1:1 ratio by weight. The vial was vigorously mixed for 5 minutes. Approximately 1 g of the mixture was added to a round bottom flask. The material was exposed to a UV lamp through the side of the flask for approximately 30 minutes. Radiation cure was observed and the resulting material was a clear solid.

Example 11 (Comparative): Mixture of 2,2-Dimethoxy-1-Thia-2-Silacyclopentane and 1,3,5,7-Tetravinyl-1,3,5,7-Tetramethylcyclotetrasiloxane Exposed to Heat in Dry, Inert Atmosphere

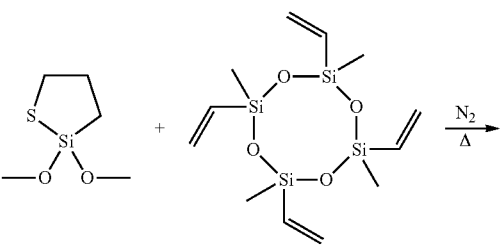

The experiment described in Example 1 was repeated except that 1,3,5,7-tetravinyl-1,3,5,7-tetramethylcyclotetrasiloxane (Gelest product code: SIT7900) was substituted for VMM-010. No cure was observed. The material remained a clear liquid.

Example 12 (Comparative): Mixture of 2,2-Dimethoxy-1-Thia-2-Silacyclopentane and 1,3,5,7-Tetravinyl-1,3,5,7-Tetramethylcyclotetrasiloxane Exposed to Heat in Air

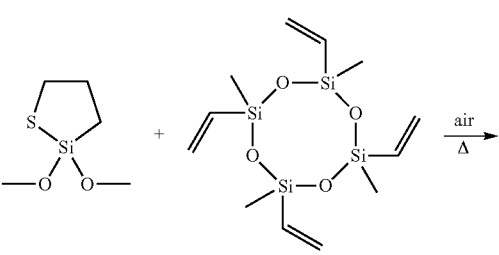

The experiment described in Example 2 was repeated except that 1,3,5,7-tetravinyl-1,3,5,7-tetramethylcyclotetrasiloxane (Gelest product code: SIT7900) was substituted for VMM-010. No cure was observed. The material remained a clear liquid.

Example 13 (Comparative): Mixture of 2,2-Dimethoxy-1-Thia-2-Silacyclopentane and 1,3,5,7-Tetravinyl-1,3,5,7-Tetramethylcyclotetrasiloxane Exposed to UV Source in Dry, Inert Atmosphere

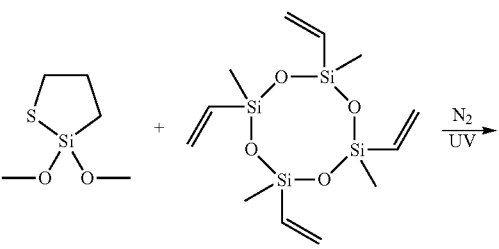

The experiment described in Example 3 was repeated except that 1,3,5,7-tetravinyl-1,3,5,7-tetramethylcyclotetrasiloxane (Gelest product code: SIT7900) was substituted for VMM-010. No cure was observed. The material remained a clear liquid.

Example 14: Mixture of 2,2-Dimethoxy-1-Thia-2-Silacyclopentane and 1,3,5,7-Tetravinyl-1,3,5,7-Tetramethylcyclotetrasiloxane Exposed to UV Source in Air

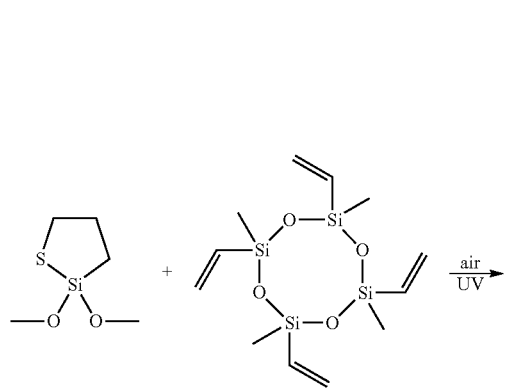

2,2-Dimethoxy-1-thia-2-silacyclopentane (Gelest product code: SID3545.0) and 1,3,5,7-tetravinyl-1,3,5,7-tetramethylcyclotetrasiloxane (Gelest product code: SIT7900.0) were added to a vial in a 1:1 ratio by weight. The vial was vigorously mixed for 5 minutes. The mixture was added to a small glass petri dish in a thin layer (<0.5 mm) and exposed to a UV lamp for 10 minutes. Radiation cure was observed. The resulting material was a clear, brittle solid.

Example 15: Mixture of 2,2-Dimethoxy-1-Thia-2-Silacyclopentane and 1,3,5,7-Tetravinyl-1,3,5,7-Tetramethylcyclotetrasiloxane Exposed to UV Source in Air

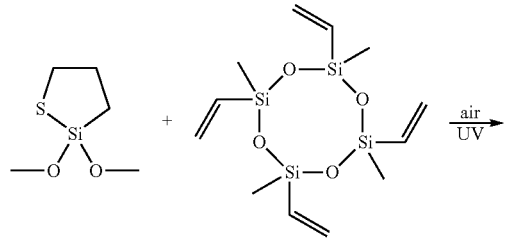

2,2-Dimethoxy-1-thia-2-silacyclopentane (Gelest product code: SID3545.0) and 1,3,5,7-tetravinyl-1,3,5,7-tetramethylcyclotetrasiloxane (Gelest product code: SIT7900.0) were added to a vial in a 1:1 ratio by weight. The vial was vigorously mixed for 5 minutes. Approximately 1 g of the mixture was added to a round bottom flask. The material was exposed to a UV lamp through the side of the flask for approximately 30 minutes. Radiation cure was observed and the resulting material was a clear solid.

Example 16 (Comparative): Mixture of 2,2-Dimethoxy-1-Thia-2-Silacyclopentane and Vinyl Terminated (15-17% Diphenylsiloxane)-Dimethylsiloxane Copolymer, 500 cSt Exposed to Heat in Dry, Inert Atmosphere

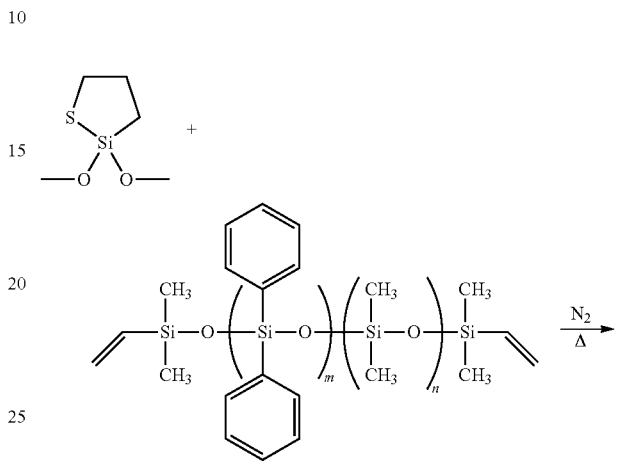

The experiment described in Example 1 was repeated except that vinyl terminated (15-17% diphenylsiloxane)-dimethylsiloxane copolymer, 500 cSt (Gelest product code: PDV-1625) was substituted for VMM-010. No cure was observed. The material remained a clear liquid.

Example 17 (Comparative): Mixture of 2,2-Dimethoxy-1-Thia-2-Silacyclopentane and Vinyl Terminated (15-17% Diphenylsiloxane)-Dimethylsiloxane Copolymer, 500 cSt Exposed to Heat in Air

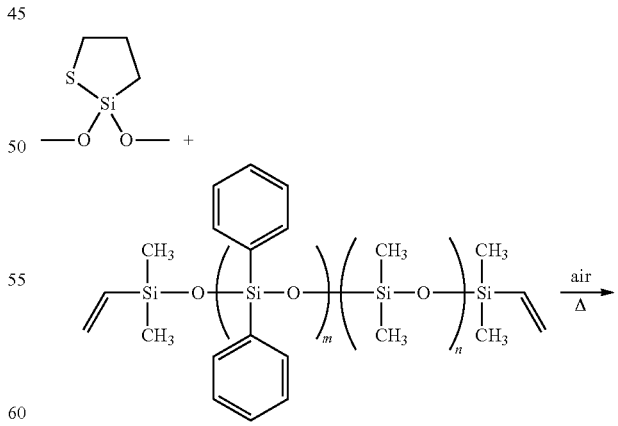

The experiment described in Example 2 was repeated except that vinyl terminated (15-17% diphenylsiloxane)-dimethylsiloxane copolymer, 500 cSt (Gelest product code: PDV-1625) was substituted for VMM-010. No cure was observed. The material ramined a clear liquid.

Example 18 (Comparative): Mixture of 2,2-Dimethoxy-1-Thia-2-Silacyclopentane and Vinyl Terminated (15-17% Diphenylsiloxane)-Dimethylsiloxane Copolymer, 500 cSt Exposed to UV Source in Dry, Inert Atmosphere

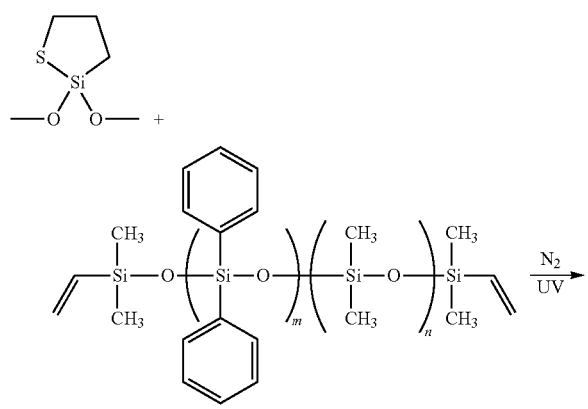

The experiment described in Example 3 was repeated except that vinyl terminated (15-17% diphenylsiloxane)-dimethylsiloxane copolymer, 500 cSt (Gelest product code: PDV-1625) was substituted for VMM-010. No cure was observed. The material remained a clear liquid.

Example 19: Mixture of 2,2-Dimethoxy-1-Thia-2-Silacyclopentane and Vinyl Terminated (15-17% Diphenylsiloxane)-Dimethylsiloxane Copolymer, 500 cSt Exposed to UV Source in Air

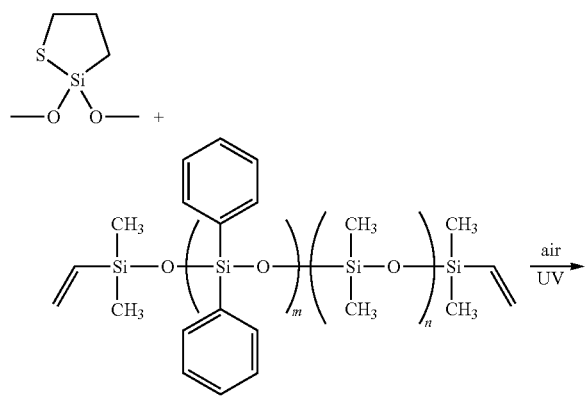

2,2-Dimethoxy-1-thia-2-silacyclopentane (Gelest product code: SID3545.0) and vinyl terminated (15-17% diphenylsiloxane)-dimethylsiloxane copolymer, 500 cSt (Gelest product code: PDV-1625) were added to a vial in a 1:1 ratio by weight. The vial was vigorously mixed for 5 minutes. The mixture was added to a small glass petri dish in a thin layer (<0.5 mm) and exposed to a UV lamp for 10 minutes. Radiation cure was observed. The resulting material was a slightly hazy gel.

Example 20: Mixture of 2,2-Dimethoxy-1-Thia-2-Silacyclopentane and Vinyl Terminated (15-17% Diphenylsiloxane)-Dimethylsiloxane Copolymer, 500 cSt Exposed to UV Source in Air

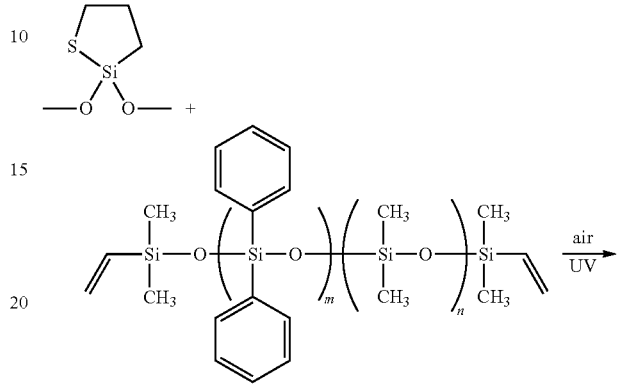

2,2-Dimethoxy-1-thia-2-silacyclopentane (Gelest product code: SID3545.0) and vinyl terminated (15-17% diphenylsiloxane)-dimethylsiloxane copolymer, 500 cSt (Gelest product code: PDV-1625) were added to a vial in a 1:1 ratio by weight. The vial was vigorously mixed for 5 minutes. Approximately 1 g of the mixture was added to a round bottom flask. The material was exposed to a UV lamp through the side of the flask for approximately 30 minutes. Radiation cure was observed. The resulting material was a slightly hazy gel.

Example 21 (Comparative): Mixture of 2,2-Dimethoxy-1-Thia-2-Silacyclopentane and 1-Octene Exposed to Heat in Dry, Inert Atmosphere

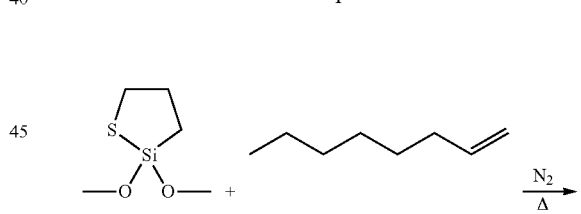

The experiment of Example 1 was repeated except that 1-octene (Gelest product code: ENE03280) was substituted for VMM-010. No cure was observed. The material remained a clear liquid.

Example 22 (Comparative): Mixture of 2,2-Dimethoxy-1-Thia-2-Silacyclopentane and 1-Octene Exposed to Heat in Air

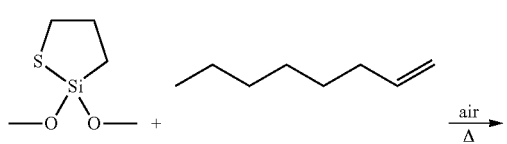

The experiment of Example 2 was repeated except that 1-octene (Gelest product code: ENE03280) was substituted for VMM-010. No cure was observed. The resulting material was a clear liquid.

Example 23 (Comparative): Mixture of
2,2-Dimethoxy-1-Thia-2-Silacyclopentane and
1-Octene Exposed to UV Source in Dry, Inert
Atmosphere

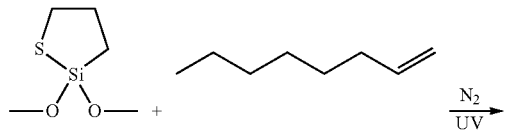

The experiment of Example 3 was repeated except that 1-octene (Gelest product code: ENE03280) was substituted for VMM-010. No cure was observed. The material remained a clear liquid.

Example 24: Mixture of
2,2-Dimethoxy-1-Thia-2-Silacyclopentane and
1-Octene Exposed to UV Source in Air

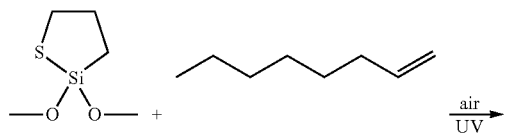

2,2-Dimethoxy-1-thia-2-silacyclopentane (Gelest product code: SID3545.0) and 1-octene (Gelest product code: ENEO3280) were added to a vial in a 1:1 ratio by weight. The vial was vigorously mixed for 5 minutes. The mixture was added to a small glass petri dish in a thin layer (<0.5 mm) and exposed to a UV lamp for 10 minutes. Radiation cure was observed. The resulting material was an opaque solid with some cracking.

Example 25: Mixture of
2,2-Dimethoxy-1-Thia-2-Silacyclopentane and
1-Octene Exposed to UV Source in Air

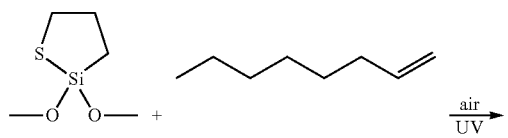

2,2-Dimethoxy-1-thia-2-silacyclopentane (Gelest product code: SID3545.0) and 1-octene (Gelest product code: ENEO3280) were added to a vial in a 1:1 ratio by weight. The vial was vigorously mixed for 5 minutes. Approximately 1 g of the mixture was added to a round bottom flask. The material was exposed to a UV lamp through the side of the flask for approximately 30 minutes. Radiation cure was observed. The resulting material was an opaque solid with some cracking.

Example 26 (Comparative): Mixture of
2,2-Dimethoxy-1-Thia-2-Silacyclopentane and
Allyloxy(Tetraethylene Oxide), Methyl Ether,
Tech-90 Exposed to Heat in Dry, Inert Atmosphere

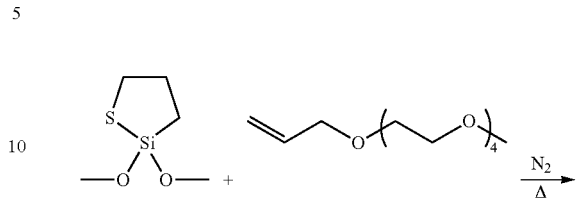

The experiment of Example 1 was repeated except that allyloxy(tetraethylene oxide), methyl ether, tech-90 (Gelest product code: ENEA0367) was substituted for VMM-010. No cure was observed. The material remained a clear liquid.

Example 27 (Comparative): Mixture of
2,2-Dimethoxy-1-Thia-2-Silacyclopentane and
Allyloxy(Tetraethylene Oxide), Methyl Ether
Exposed to Heat in Air

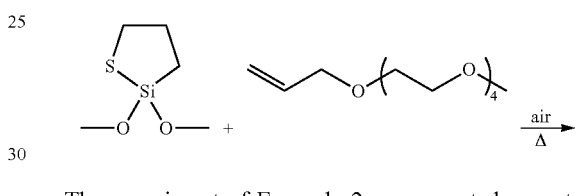

The experiment of Example 2 was repeated except that allyloxy(tetraethylene oxide), methyl ether, tech-90 (Gelest product code: ENEA0367) was substituted for VMM-010. No cure was observed. The material remained a clear liquid.

Example 28 (Comparative): Mixture of
2,2-Dimethoxy-1-Thia-2-Silacyclopentane and
Allyloxy(Tetraethylene Oxide), Methyl Ether
Exposed to UV Source in Dry, Inert Atmosphere

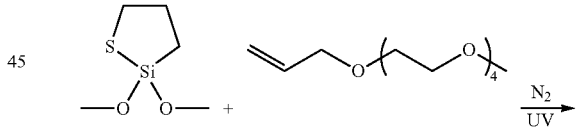

The experiment of Example 3 was repeated except that allyloxy(tetraethylene oxide), methyl ether, tech-90 (Gelest product code: ENEA0367) was substituted for VMM-010. No cure was observed. The material remained a clear liquid.

Example 29: Mixture of
2,2-Dimethoxy-1-Thia-2-Silacyclopentane and
Allyloxy(Tetraethylene Oxide), Methyl Ether
Exposed to UV Source in Air

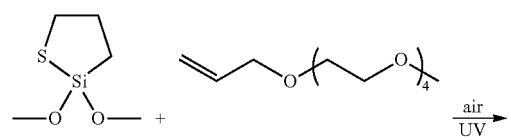

2,2-Dimethoxy-1-thia-2-silacyclopentane (Gelest product code: SID3545.0) and allyloxy(tetraethylene oxide), methyl ether, tech-90 (Gelest product code: ENEA0367) were added to a vial in a 1:1 ratio by weight. The vial was vigorously mixed for 5 minutes. The mixture was added to a small glass petri dish in a thin layer (<0.5 mm) and exposed to a UV lamp for 10 minutes. Radiation cure was observed. The resulting material was clear gel-like solid.

Example 30: Mixture of 2,2-Dimethoxy-1-Thia-2-Silacyclopentane and Allyloxy(Tetraethylene Oxide), Methyl Ether Exposed to UV Source in Air

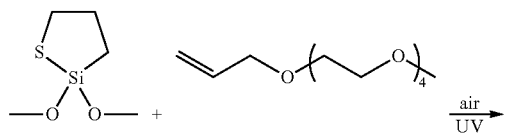

2,2-Dimethoxy-1-thia-2-silacyclopentane (Gelest product code: SID3545.0) and allyloxy(tetraethylene oxide), methyl ether, tech-90 (Gelest product code: ENEA0367) were added to a vial in a 1:1 ratio by weight. The vial was vigorously mixed for 5 minutes. Approximately 1 g of the mixture was added to a round bottom flask. The material was exposed to a UV lamp through the side of the flask for approximately 30 minutes. Radiation cure was observed. The resulting material was a clear gel.

Example 31 (Comparative): Mixture of 2,2-Dimethoxy-1-thia-2-silacyclopentane and 1,3,5,7-Tetravinyl-1,3,5,7-tetramethylcyclotetrasiloxane Exposed to UV Source in Dry, Inert Atmosphere

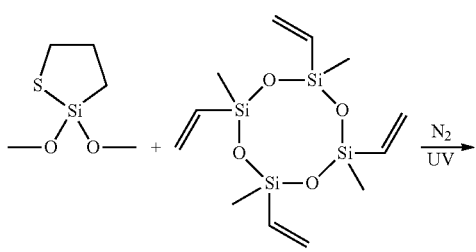

2,2-Dimethoxy-1-thia-2-silacyclopentane (Gelest product code: SID3545.0) and 1,3,5,7-tetravinyl-1,3,5,7-tetramethylcyclotetrasiloxane (Gelest product code: SIT7900.0) were added to a vial in a 1:1 ratio by weight. The vial was vigorously mixed for 5 minutes. Approximately 0.75 g of the mixture was added to a round bottom flask. The flask was purged with $N_2$ and sealed using a glass stopper and clamp. The material was exposed to a UV lamp through the side of the flask for approximately 30 minutes. The material remained a clear, colorless liquid. A solid was not formed. No cure was observed.

Example 32: Mixture of 2,2-Dimethoxy-1-thia-2-silacyclopentane and 1,3,5,7-Tetravinyl-1,3,5,7-tetramethylcyclotetrasiloxane Exposed to UV Source in Dry, Inert Atmosphere in the Presence of Fumed Silica

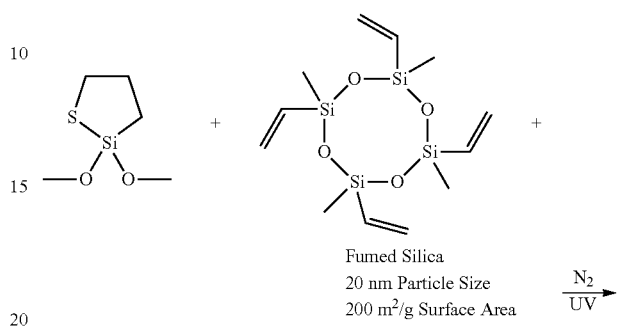

0.2 g of fumed silica (12-20 nm particle size; 200 $m^2$/g surface area; Gelest product code: SIS6960.0) was added to a vial containing 4 g of a 1:1 w/w mixture of 2,2-dimethoxy-1-thia-2-silacyclopentane (Gelest product code: SID3545.0) and 1,3,5,7-tetravinyl-1,3,5,7-tetramethylcyclotetrasiloxane (Gelest product code: SIT7900.0). The vial was vigorously mixed for 5 minutes and a viscous, free-flowing hazy liquid was recovered. Approximately 0.75 g of the mixture was added to a round bottom flask. The flask was purged with $N_2$ and sealed using a glass stopper and clamp. The material was exposed to a UV lamp through the side of the flask for approximately 30 minutes. Radiation cure was observed. The resulting material was a slightly hazy, free-standing gel.

Example 33 (Comparative): Mechanical Properties of Untreated Borosilicate Glass Slide An untreated borosilicate glass slide was broken using a three-point bend test method. The yield load of the glass slide was 0.021% and the yield stress was 79 mPa.

Example 34: Mechanical Properties of Borosilicate Glass Slide Treated with Mixture of 2,2-Dimethoxy-1-thia-2-Silacyclopentane and Vinylmethoxysiloxane Homopolymer, 8-12 cSt A borosilicate glass slide was dipped in 1:1 w/w mixture of 2,2-dimethoxy-1-thia-2-silacyclopentane and vinylmethoxysiloxane homopolymer (Gelest product codes SID3545.0 and VMM-010) for 10 minutes. The slide was removed from the solution and exposed to UV irradiation in air for 5 minutes, forming a clear, flexible coating with a refractive index of 1.46. The slide was then broken using a three-point bend test method. The yield load of the glass slide was 0.034% and the yield stress was 127 mPa. This glass slide was approximately 60% stronger than the glass slide from the comparative example.

Example 35: Mechanical Properties of Moisture Conditioned Borosilicate Glass Slide Treated with Mixture of 2,2-Dimethoxy-1-Thia-2-Silacyclopentane and Vinylmethoxysiloxane Homopolymer, 8-12 cSt A new borosilicate glass slide was moisture conditioned by soaking in deionized water for 24 hours. The slide was then dipped in 1:1 w/w mixture of 2,2-dimethoxy-1-thia-2-silacyclopentane and vinylmethoxysiloxane homopolymer (Gelest product codes SID3545.0 and VMM-010) for 10 minutes. The slide was removed from the solution and exposed to UV irradiation in air for 5 minutes, forming a clear, flexible coating with a refractive index of 1.46. The slide was then broken using a three-point bend test method. The yield load of the glass slide was 0.032% and the yield stress was 117 mPa. This glass slide was approximately 50% stronger than the glass slide from the comparative example.

It will be appreciated by those skilled in the art that changes could be made to the embodiment described above without departing from the broad inventive concepts thereof. Also, based on this disclosure, a person of ordinary skill in the art would further recognize that the relative proportions of the components illustrated above could be varied without departing from the spirit and scope of the invention. It is understood, therefor, that this invention is not limited to that particular embodiment disclosed, but it is intended to cover modifications within the spirit and scope of the present invention as defined by the appended claims.

We claim:

1. A composition comprising a cyclic thiasilacyclopentane and an unsaturated component, wherein the cyclic thiasilacyclopentane has an alkoxy substituent and/or the unsaturated component has a multiplicity of unsaturated sites, and wherein when the composition is exposed to hydroxyl groups on a surface or to atmospheric moisture and subsequently or concurrently irradiated, the composition cures to form a solid film or solid mass by radiation cure.

2. The composition according to claim 1, wherein the cyclic thiasilacyclopentane is 2,2-dimethoxy-1-thia-2-silacyclopentane.

3. The composition according to claim 2, wherein the unsaturated component is a vinylmethoxysiloxane homopolymer.

4. The composition according to claim 2, wherein the unsaturated component is vinyltrimethoxysilane.

5. The composition according to claim 2, wherein the unsaturated component is 1,3,5,7-tetravinyl-1,3,5,7-tetramethylcyclotetrasiloxane.

6. The composition according to claim 2, wherein the unsaturated component is a vinyl terminated (diphenylsiloxane)-dimethylsiloxane copolymer.

7. The composition according to claim 2, wherein the unsaturated component is 1-octene.

8. The composition according to claim 2, wherein the unsaturated component is allyloxy(tetraethylene oxide) methyl ether.

9. The composition according to claim 1, wherein the unsaturated component is a polymer or a molecule.

10. The composition according to claim 1, wherein the unsaturated component is selected from the group consisting of 2,2-dimethoxy-1-thia-2-silacyclopentane, a vinylmethoxysiloxane homopolymer, vinyltrimethoxysilane, 1,3,5,7-tetravinyl-1,3,5,7-tetramethylcyclotetrasiloxane, a vinyl terminated (diphenylsiloxane)-dimethylsiloxane copolymer, 1-octene, and allyloxy(tetraethylene oxide) methyl ether.

11. The composition according to claim 1, wherein the composition is cured by UV irradiation, visible light, or electron beam radiation.

12. A method for producing a solid film comprising exposing a composition to hydroxyl groups on a surface or atmospheric moisture followed by or concurrently with irradiating the composition, wherein the composition comprises a cyclic thiasilacyclopentane and an unsaturated component, and wherein the cyclic thiasilacyclopentane has an alkoxy substituent and/or the unsaturated component has a multiplicity of unsaturated sites.

13. The method according to claim 12, wherein the composition is irradiated for about 10 to about 30 minutes.

14. The method according to claim 12, wherein the composition is irradiated in the presence of fumed silica.

15. The method according to claim 12, wherein the irradiation is selected from UV, visible light, and electron beam.

16. The method according to claim 12, wherein the cyclic thiasilacyclopentane is 2,2-dimethoxy-1-thia-2-silacyclopentane.

17. The method according to claim 16, wherein the unsaturated component is a vinylmethoxysiloxane homopolymer.

18. The method according to claim 16, wherein the unsaturated component is vinyltrimethoxysilane.

19. The method according to claim 16, wherein the unsaturated component is 1,3,5,7-tetravinyl-1,3,5,7-tetramethylcyclotetrasiloxane.

20. The method according to claim 16, wherein the unsaturated component is a vinyl terminated (diphenylsiloxane)-dimethylsiloxane copolymer.

21. The method according to claim 16, wherein the unsaturated component is 1-octene.

22. The method according to claim 16, wherein the unsaturated component is allyloxy(tetraethylene oxide) methyl ether.

23. The method according to claim 12, wherein the unsaturated component is a polymer or a molecule.

24. The method according to claim 12, wherein the unsaturated component is selected from the group consisting of 2,2-dimethoxy-1-thia-2-silacyclopentane, a vinylmethoxysiloxane homopolymer, vinyltrimethoxysilane, 1,3,5,7-tetravinyl-1,3,5,7-tetramethylcyclotetrasiloxane, a vinyl terminated (diphenylsiloxane)-dimethylsiloxane copolymer, 1-octene, and allyloxy(tetraethylene oxide) methyl ether.

* * * * *